United States Patent
Li et al.

(10) Patent No.: US 9,750,084 B2
(45) Date of Patent: Aug. 29, 2017

(54) APPARATUS, METHOD, AND SYSTEM FOR DESYNCHRONIZING NOTIFICATIONS ACROSS MULTIPLE DEVICES

(71) Applicant: Samsung Electronics Co., Ltd., Suwon-si, Gyeonggi-do (KR)

(72) Inventors: Zhiyun Li, Kenmore, WA (US); Andrew Mast, Issaquah, WA (US); Rajesh Yengisetty, Bellevue, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 14/265,817

(22) Filed: Apr. 30, 2014

(65) Prior Publication Data
US 2015/0319806 A1  Nov. 5, 2015

(51) Int. Cl.
| H04W 88/18 | (2009.01) |
| H04M 1/725 | (2006.01) |
| H04W 4/14 | (2009.01) |
| H04W 4/12 | (2009.01) |

(52) U.S. Cl.
CPC ..... *H04W 88/184* (2013.01); *H04M 1/72552* (2013.01); *H04W 4/12* (2013.01); *H04W 4/14* (2013.01)

(58) Field of Classification Search
CPC .............................. H04L 69/329; H04M 1/57
USPC ....................................... 455/412.2; 340/10.4
See application file for complete search history.

(56) References Cited

U.S. PATENT DOCUMENTS

| 8,884,736 B1 * | 11/2014 | Gravino | G05B 15/02 340/10.4 |
| 2006/0150175 A1 | 7/2006 | Etelapera | |
| 2012/0278475 A1 | 11/2012 | Papakipos et al. | |
| 2013/0325922 A1 * | 12/2013 | Chaudhri | G06Q 10/10 709/203 |

FOREIGN PATENT DOCUMENTS

EP        2 669 854 A1      12/2013

* cited by examiner

*Primary Examiner* — Thomas Lett
(74) *Attorney, Agent, or Firm* — Jefferson IP Law, LLP (57) ABSTRACT

An apparatus and method for desynchronizing notifications across multiple electronic devices are provided. The method includes receiving, by a primary electronic device, a notification, transmitting, by the primary electronic device, the notification to a companion electronic device with which the primary electronic device is synchronized, and desynchronizing a providing of the notification at the companion electronic device.

40 Claims, 6 Drawing Sheets

APPARATUS, METHOD, AND SYSTEM FOR DESYNCHRONIZING NOTIFICATIONS ACROSS MULTIPLE DEVICES

TECHNICAL FIELD

The present disclosure relates to an apparatus, method, and system for desynchronizing notifications across multiple electronic devices. More particularly, the present disclosure relates to an apparatus and method for delaying or preventing a notification from being displayed on at least one of a plurality of synchronized electronic devices.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), e-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

According to the related art, a plurality of devices may be synchronized. For example, the plurality electronic devices may be synchronized so as to provide synchronized notifications. If a plurality of electronic devices are synchronized to provide synchronized notifications, then a notification will be contemporaneously displayed on the plurality of electronic devices (e.g., the plurality of electronic devices will display the notifications at substantially the same time). As an example, a mobile terminal may be synchronized with another mobile terminal, a television, and/or the like. The mobile terminal may receive a message (e.g., an e-mail, an SMS message, and/or the like), and based on receipt of the message, the mobile terminal may generate a notification and provide the notification to the user of the mobile terminal. In addition, electronic devices with which the mobile terminal is synchronized may contemporaneously provide the notification to the user.

Accordingly, there is a need for an apparatus, method, and system for providing improved notifications across synchronized electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for desynchronizing notifications across multiple devices.

In accordance with an aspect of the present disclosure, a method for desynchronizing notifications across multiple electronic devices is provided. The method includes receiving, by a primary electronic device, a notification, transmitting, by the primary electronic device, the notification to a companion electronic device with which the primary electronic device is synchronized, and desynchronizing a providing of the notification at the companion electronic device.

In accordance with another aspect of the present disclosure, a primary electronic device for desynchronizing notifications across multiple devices is provided. The primary electronic device includes a communication unit configured to communicate using at least one of a wired connection and a wireless connection, and a controller configured to operatively receive a notification using the communication unit, to operatively transmit the notification to a companion electronic device with which the primary electronic device is synchronized, and to desynchronize a providing of the notification at the companion electronic device.

In accordance with another aspect of the present disclosure, a companion electronic device for desynchronizing notifications across devices is provided. The companion electronic device includes a communication unit configured to communicate using at least one of a wired connection and a wireless connection, an output unit configured to output a notification, and a controller configured to operatively receive the notification using the communication unit, and to desynchronize a providing of the notification at the companion electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk ("DVD") player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography ("CT") device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus, method, and system for desynchronizing notifications across multiple electronic devices.

According to the related art, a mobile terminal may be synchronized with another mobile terminal and/or a television. The synchronized mobile terminals, and television may provide synchronous notification of receipt of a message (e.g., an e-mail, a Short Messaging Service (SMS), and/or a Multimedia Message Service (MMS)). Based on the synchronization of the mobile terminals and the television, the television may display a notification of a message or an event (e.g., an alarm, a calendar reminder, and/or the like) received by the mobile terminal. The providing (e.g., display) of notifications on devices synchronized with the mobile terminal may provide the notification in a public setting (e.g., a public forum). For example, if the mobile terminal is synchronized with a television, the notification may be displayed on a television in the presence of others. According to the related art, the mobile terminal and/or the devices to which the mobile terminal is synchronized do not distinguish between notifications acceptable for public consumption (e.g., public viewing) and notifications for which a level of privacy may be expected (e.g., notifications that may not be acceptable for public consumption). As a result, all notifications provided by the mobile terminal are also provided by the devices to which the mobile terminal is be synchronized.

According to various embodiments of the present disclosure, a user may not want all notifications provided to a primary electronic device (e.g., the user's mobile terminal) to be provided by the devices to which the primary electronic device is synchronized. According to various embodiments of the present disclosure, the user may want a certain level of privacy so as to prevent personal messages to be displayed by devices that are viewable to another person. As an example, a user may not want a very personal message to be displayed by a TV while guests are watching a program on the TV. According to various embodiments of the present disclosure, the providing of the same notification on every synchronized device may cause inconvenience to the user (e.g., the user may find hearing/seeing the same notification on all synchronized devices to be annoying).

According to various embodiments of the present disclosure, a plurality of electronic devices may be synchronized. According to various embodiments of the present disclosure, a user may have a primary electronic device that is synchronized with at least one other electronic device. According to various embodiments of the present disclosure, the primary electronic device may be an electronic device that is portable such as a mobile terminal. The primary electronic device may be paired or otherwise synchronized with at least one companion electronic device.

According to various embodiments of the present disclosure, each time the primary electronic device receives (or generates) a notification (e.g., a notification is delivered to the primary electronic device), the primary electronic device may forward the notification to at least one of the companion electronic devices paired or synchronized with the primary electronic device. For example, the primary electronic device may generate a notification based on receipt of a message (e.g., an e-mail, an SMS message, an MMS message, an instant message, and/or the like), based on an event (e.g., an alarm, a calendar reminder, and/or the like), and/or the like. The primary electronic device may forward the notification to each (and/or any subset) of the companion electronic devices paired or synchronized with the primary electronic device.

According to various embodiments of the present disclosure, if a companion electronic device receives a notification from a primary electronic device, the companion electronic device may desynchronize the display of notifications. For example, the companion electronic device may not immediately provide (e.g., display) the notification received from the primary electronic device.

According to various embodiments of the present disclosure, a companion electronic device may insert a preset delay between the receipt of a notification from a primary electronic device synced or paired therewith and the providing of the notification. According to various embodiments of the present disclosure, the preset delay may be configurable. For example, the present delay may be configured according to user preferences, settings, and/or the like.

According to various embodiments of the present disclosure, if a companion electronic device receives a notification, the companion electronic device may display a subset of information (e.g., metadata) relating to the notification. According to various embodiments of the present disclosure, the companion electronic device may display information relating to the notification in a stepwise manner. For example, the companion electronic device may incrementally display more information relating to the notification (e.g., according to time, user input, and/or the like).

According to various embodiments of the present disclosure, a notification may be displayed according to a variety of subsets of information relating to the notification. The subsets of information relating to the notification may be determined according to a level of privacy. For example, each subset of information relating to the notification may have varying scopes of information relating to the notification according to a level of privacy associated with the notification. As an example, if a calendar notification for a doctor's appointment is received (e.g., delivered to the primary electronic device), the subsets of information relating to the notification may correspond to (i) a generic calendar event reminder without any details (e.g., the subset indicating a time of the event, a time until the event begins, and/or the like), (ii) an appointment reminder (e.g., the subset indicating that the reminder corresponds to an appointment), (iii) a doctor's appointment reminder (e.g., the subset indicating that the reminder corresponds to a doctor's appointment), (iv) a doctor's appointment reminder with specific doctor details (e.g., the subset indicating that the reminder corresponds to a doctor's appointment with a user's primary physician, and/or the like), and (v) a reminder indicating that the doctor's appointment corresponds to an annual physical exam appointment (e.g., the subset indicating that the reminder corresponds to a specific doctor's appointment such as an annual physical exam, detailed information relating to the appointment such as instructions that blood may be drawn at the appointment and that fasting may be required, and/or the like). As discussed above, the subsets of information relating to the notification may include information relating to varying degrees of privacy. According to various embodiments of the present disclosure, a subset of information relating to the notification that includes private information may include all of or a portion of information provided in any subset of information of less private information. For example, with reference to the example of the doctor's appointment above, the reminder indicating that the doctor's appointment corresponds to an annual physical exam may include any portion of information from the other subsets of information in addition to additional private information not included in the other subsets of information.

According to various embodiments of the present disclosure, the subsets of information relating to the notification may be arranged according to a level of privacy of associated with the information included therein. According to various embodiments of the present disclosure, the primary electronic device may progressively communicate subsets of information relating to the notification such that each subsequent subset of information corresponds to a progressively more private communication (e.g., a subset including information that is progressively more private).

According to various embodiments of the present disclosure, a companion electronic device may provide a notification in multiple steps. As an example, the companion electronic device may insert a pause for a preset time interval between the multiple steps. As another example, after providing a step of the notification, the companion electronic device may pause until a preset user input is received; after the preset user input is received, the companion electronic device may provide the next step of the notification.

According to various embodiments of the present disclosure, a companion electronic device may provide metadata associated with the notification. According to various embodiments of the present disclosure, different metadata associated with the notification may be provided at different times. For example, varying amounts of metadata may be displayed according to time (e.g., according to time from receipt of the notification by the companion electronic device, according to time from a previous display of different metadata associated with the notification, and/or the like).

According to various embodiments of the present disclosure, a companion electronic device may provide a notification with incrementally increasing opacity. For example, the companion electronic device may initially provide the notification so as to be displayed relatively transparent. The notification may be displayed with greater opacity according to time (e.g., according to time from receipt of the notification by the companion time, according to time from a previous display of the notification, and/or the like). As an example, when the companion electronic device initially displays the notification, the notification may be displayed so as to be completely transparent.

According to various embodiments of the present disclosure, a companion electronic device may provide a notification with incrementally increasing intensity. For example, if the notification is an audio notification, the companion electronic device may initially provide the notification at a predetermined volume level and thereafter incrementally increase the volume of the notification. As another example, if the notification is displayed, then the companion electronic device may display the notification as faint and incrementally increasing the display of the notification (e.g., so as to increasingly display the notification emphatically in relation to other items being displayed).

According to various embodiments of the present disclosure, a companion electronic device may delay providing the notification. According to various embodiments of the present disclosure, the companion electronic device may insert a predetermined delay between receipt of the notification (e.g., from the primary electronic device) and providing the notification. According to various embodiments of the present disclosure, the companion electronic device may provide the notification according to a context of at least one of the companion electronic device and the user of the companion electronic device. As an example, if the companion electronic device is assumed to be a TV and the companion electronic device is displaying a program, then upon receipt of a notification, the companion electronic device may delay display of the notification until a predetermined event (e.g., a break in the program such a pause of the program, a stop of the program, a commercial, and/or the like).

According to various embodiments of the present disclosure, a user may receive a notification using a primary electronic device. For example, even though the primary electronic device may forward a notification to devices to which the primary electronic device is synchronized, the user may receive the notification using the primary electronic device (e.g., the user may hear the notification from the primary electronic device, the user may view the notification on the primary electronic device, and/or the like). According to various embodiments of the present disclosure, if the user receives the notification using the primary electronic device (e.g., if the user views the notification on the primary electronic device), then the primary electronic device may communicate (e.g., send) an indication that the user received the notification to at least one companion electronic device to which the primary electronic device is synchronized. The primary electronic device may send an indication that the user received (e.g., consumed) the notification to all companion electronic devices to which the primary electronic device is synchronized (e.g., or to all such companion electronic devices that have the capability to receive and provide notifications). According to various embodiments of the present disclosure, the indication may be an interrupt. For example, the indication may be an interrupt to desynchronize the providing of the notification by at least one companion electronic device to which the primary electronic device is synchronized.

According to various embodiments of the present disclosure, if a companion electronic device receives an indication that the user has received (e.g., consumed) the notification using the primary electronic device (e.g., that the user has viewed the notification on the primary electronic device), then the companion electronic device may stop providing the notification, cancel the providing of the notification, delay the providing of the notification, and/or the like. For example, when a companion electronic device receives an indication that the user received (e.g., consumed) the notification from another device (e.g., the primary electronic device), then the companion electronic device may no longer provide the notification to the user. As another example, if the companion electronic device had delayed providing the notification to the user until an occurrence of a predetermined event, and if the companion electronic device receives an indication that the user received (e.g., consumed) the notification from another device before the predetermined event occurs, then the companion electronic device may cancel providing the notification (e.g., on that companion electronic device) such that even if the predetermined event occurs, the companion electronic device may not provide the notification to the user.

According to various embodiments of the present disclosure, a user may receive (e.g., consume) a notification on a device (e.g., a primary electronic device or any device that is synchronized with the primary electronic device, and/or the like). The device by which the user received (e.g., consumed) the notification (e.g., the device on which the user viewed the notification) may communicate an indication that the user received (e.g., consumed) the notification to another device. For example, the device on which the user viewed the notification may communicate an indication that the user received (e.g., consumed) the notification to a primary electronic device (e.g., if the device on which the user viewed the notification corresponds to a companion electronic device), to at least one companion electronic device (e.g., if the device on which the user viewed or otherwise consumed the notification corresponds to the primary electronic device), to at least one other companion electronic device that is synchronized with the primary electronic device (e.g., if the device on which the user viewed or otherwise consumed the notification corresponds to a companion electronic device), or any combination thereof.

According to various embodiments of the present disclosure, if a device receives an indication that a user received (e.g., consumed) the notification from another device, then the device may selectively interrupt the process of providing the notification to the user. For example, the device may selectively interrupt the process of providing the notification to the user according to user settings (e.g., which may be configurable). As an example, the device may selectively interrupt the process of providing the notification to the user according to a characterization of the notification (e.g., according to a notification type)—the device may interrupt the process of providing notifications of a preset first type of notification, may not interrupt the process of providing notification of a preset second type of notification, and/or the like.

According to various embodiments of the present disclosure, a primary electronic device may communicate an interrupt for interrupting a notification providing process to a companion electronic device synchronized therewith according to a context of the primary electronic device. The primary electronic device may communicate the interrupt to a companion electronic device if (e.g., when) the primary electronic device determines that the screen thereof is on, if (e.g., when) the primary electronic device determines that the user is (still) holding the primary electronic device (e.g., using a motion sensor, a touch sensor, and/or the like), if (e.g., when) the primary electronic device determines that the user is looking at the primary electronic device (or the screen thereof) (e.g., using a camera such a front camera, and/or the like), the like, or a combination thereof. For example, according to various embodiments of the present disclosure, the primary electronic device may communicate the interrupt to a companion electronic device when the primary electronic device determines that the user is holding the primary electronic device and viewing the screen thereof. According to various embodiments of the present disclosure, the primary electronic device may communicate the interrupt to a companion electronic device when the primary electronic device determines that the user is holding the primary electronic device and viewing the screen thereof while the primary electronic device is displaying the notification.

According to various embodiments of the present disclosure, a primary electronic device may desynchronize a providing of a notification with companion electronic devices synchronized with the primary electronic device if a notification is received (e.g., consumed) by the primary electronic device if (e.g., when) the primary electronic device determines that the screen thereof is on, if (e.g., when) the primary electronic device determines that the user is (still) holding the primary electronic device (e.g., using a motion sensor, a touch sensor, and/or the like), if (e.g., when) the primary electronic device determines that the user is looking at the primary electronic device (or the screen thereof) (e.g., using a camera such a front camera, and/or the like), the like, or a combination thereof. For example, according to various embodiments of the present disclosure, the primary electronic device may not provide (e.g., communicate) a notification or an indication thereof to a companion electronic device when the primary electronic device determines that the user is holding the primary electronic device and viewing the screen thereof when the primary electronic device receives the notification. According to such an example, in such a context, the primary electronic device is not required to communicate an interrupt to a companion electronic device in order to desynchronize providing such a notification because the primary electronic device did not communicate the notification to the companion electronic device.

Figure 1:
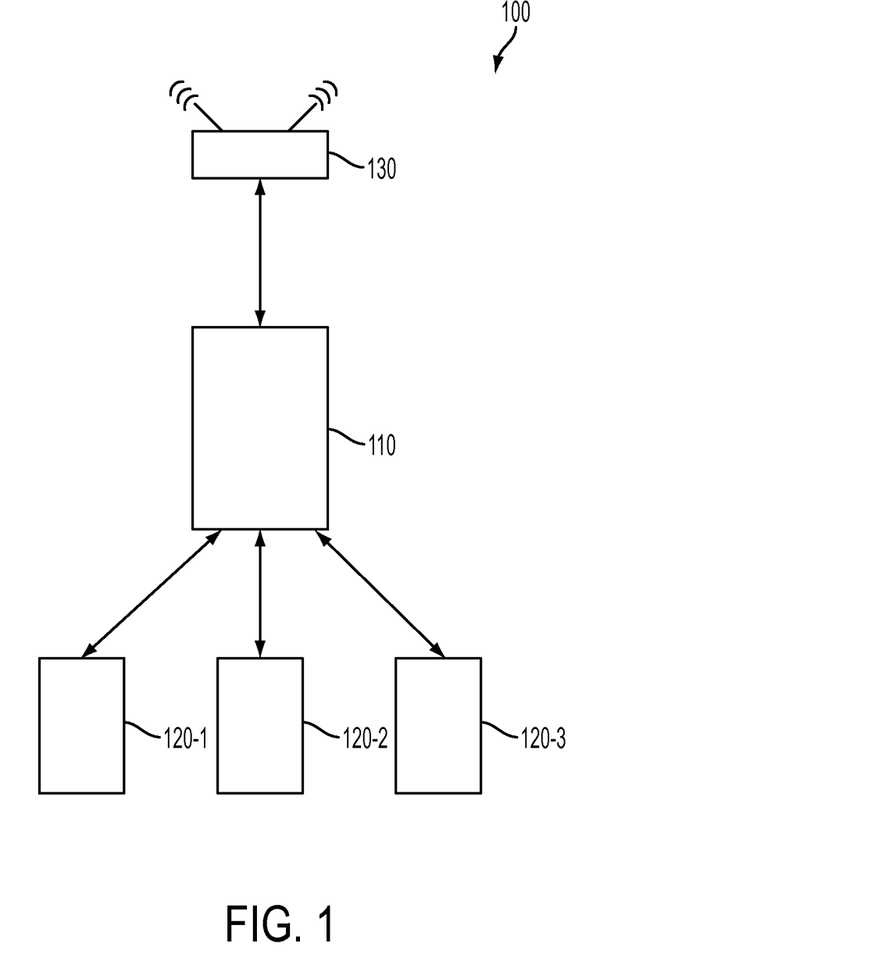
FIG. 1 illustrates a system of devices for providing notifications according to an embodiment of the present disclosure.

FIG. 1 illustrates a system of devices for providing notifications according to an embodiment of the present disclosure.

Referring to FIG. 1, a system 100 for providing notifications may include a plurality of electronic devices. In particular, the system 100 may include a primary electronic device 110 and at least one companion electronic device (e.g., electronic device 120-1, electronic device 120-2, and/or electronic device 120-3). According to various embodiments of the present disclosure, the primary electronic device 110 may be a smartphone or another electronic device. According to various embodiments of the present disclosure, the at least one companion electronic device may be a TV, a tablet, or another electronic device.

According to various embodiments of the present disclosure, the system may include an Access Point (AP) 130 providing connectivity to the primary electronic device 110. The AP 130 may also provide connectivity to at least one of the electronic device 120-1, the electronic device 120-2, and the electronic device 120-3. The AP 130 may provide network connectivity to the primary electronic device 120, the electronic device 120-1, the electronic device 120-2, and/or the electronic device 120-3. For example, the AP 130 may allow the electronic device 120-1, the electronic device 120-2, and the electronic device 120-3 to access the internet. The primary electronic device 110, the electronic device 120-1, the electronic device 120-2, and/or the electronic device 120-3 may be connected to the AP 130 through at least one of a wired connection and a wireless connection.

According to various embodiments of the present disclosure, the primary electronic device 110 may be configured to be synchronized with at least one of the electronic device 120-1, the electronic device 120-2, and the electronic device 120-3. The primary electronic device 110 may be connected to at least one of the electronic device 120-1, the electronic device 120-2, and the electronic device 120-3 using at least one of a wired connection and a wireless connection. For example, the primary electronic device 110 may be connected to a companion electronic device using Bluetooth connectivity, WiFi connectivity, WiFi Direct connectivity, Near Field Communication (NFC) connectivity, Infrared Data Association (IrDA) connectivity, and/or the like.

According to various embodiments of the present disclosure, the primary electronic device 110 may receive a notification from the AP 130 (e.g., the AP 130 may deliver a notification to the primary electronic device 110), at least one companion electronic device, and/or the like. According to various embodiments of the present disclosure, the primary electronic device 110 may generate a notification (e.g., a contextual alert, a reminder of a calendar event, and/or the like).

According to various embodiments of the present disclosure, the primary electronic device 110 may be configured to desynchronize the communication of notifications between the primary electronic device 110 and at least one companion electronic device (e.g., desynchronize the transmission of notifications from the primary electronic device 110 to a companion electronic device). According to various embodiments of the present disclosure, the primary electronic device 110 may be configured to desynchronize the communication of notifications between the primary electronic device and a subset of all companion electronic devices with which the primary electronic device 110 is synchronized. For example, the primary electronic device 110 may be configured to desynchronize the communication of notifications between the primary electronic device 110 and companion electronic device 120-1 and companion electronic device 120-2, but the communication of notifications between the primary electronic device 110 and the companion electronic device 120-3 may be synchronized. The configuration as to whether communication of notifications between the primary electronic device 110 and a companion electronic device is synchronized or desynchronized may be set according to user preferences, user selection, contextual information relating to the primary electronic device 110, contextual information relating to a particular companion electronic device, and/or the like.

Figure 2:
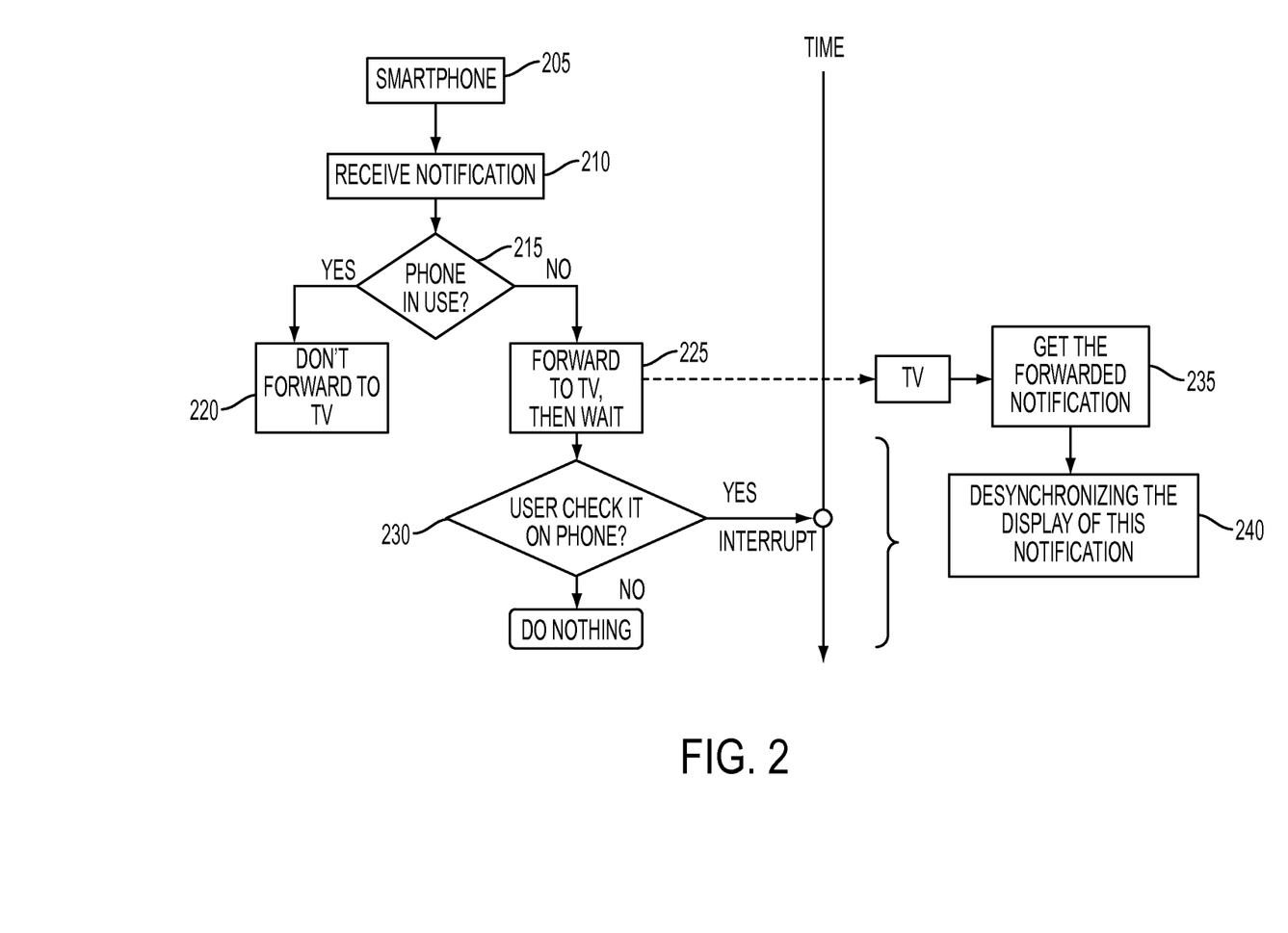
FIG. 2 illustrates a system for providing notifications according to various embodiments of the present disclosure.

FIG. 2 illustrates a system for providing notifications according to various embodiments of the present disclosure.

Referring to FIG. 2, a system in which communication of notifications between a primary electronic device and a companion electronic device is desynchronized. As an example, the primary electronic device is a smartphone and the companion electronic device is a TV.

At operation 205, a connection between the primary electronic device and the companion electronic device is established. According to various embodiments of the present disclosure, the primary electronic device and the companion electronic device may be directly connected (e.g., using Bluetooth, WiFi, and/or the like). According to various embodiments of the present disclosure, the primary electronic device and the companion electronic device may communicate over a network (e.g., rather than being in direct connection). For example, the primary electronic device may communicate with the companion electronic device through a server. As an example, the primary electronic device may connect to a wireless network such as a cellular network, and/or the like (e.g., over which the primary electronic device may receive a notification, or over which the notification may otherwise be delivered to the primary electronic device). The primary electronic device may communicate with the companion electronic device using the cellular network.

At operation 210, the primary electronic device receives a notification. For example, the notification is delivered to the primary electronic device from another electronic device, a server, a network, and/or the like. As another example, the primary electronic device may generate a notification (e.g., a contextual alert, a reminder of a calendar event, and/or the like).

At operation 215, the primary electronic device determines whether the primary electronic device is in use. For example, the primary electronic device may determine whether the primary electronic device is in use according to whether the screen is on, whether a motion of the primary electronic device is indicative of the electronic device being in use, a front camera on the primary electronic device detects that a user's eyes are looking at the primary electronic device.

If the primary electronic device determines that the primary electronic device is in use at operation 215, then the primary electronic device may proceed to operation 220 at which the primary electronic device does not communicate the notification to the companion electronic device. For example, if the primary electronic device is in use, then the primary electronic device may not forward the notification to a companion electronic device. According to various embodiments of the present disclosure, if the primary electronic device is in use when the primary electronic device receives a notification (e.g., when the notification is delivered to the primary electronic device), then the primary electronic device may only provide the notification on the primary electronic device. For example, if the primary electronic device is in use when the primary electronic device receives a notification (e.g., when the notification is delivered to the primary electronic device), then the primary electronic device may only locally provide the notification (e.g., displaying an alert, vibrating, playing a sound, and/or the like).

In contrast, if the primary electronic device determines that the primary electronic device is not in use at operation 215, then the primary electronic device may proceed to operation 225 at which the primary electronic device forwards the notification to the companion electronic device. According to various embodiments of the present disclosure, the primary electronic device may forward the notification to the companion electronic device through a direct connection therebetween (e.g., Bluetooth, WiFi, and/or the like). According to various embodiments of the present disclosure, the primary electronic device may communicate the notification to the companion electronic device over a network. For example, the primary electronic device may be registered with a wireless network (e.g., using a Subscriber Identity Module (SIM) card), and the primary electronic device may receive the notification over the wireless network (e.g. the notification may be delivered to the primary electronic device over a wireless connection). The primary electronic device may communicate the notification to the companion electronic device over the wireless network. For example, the companion electronic device may be registered with a wireless network (e.g., using a SIM card), and the companion electronic device may receive the notification from the primary electronic device over the wireless network. The primary electronic device may communicate the notification to the companion electronic device using a push service.

At operation 230, the primary electronic device determines whether a user checks the primary electronic device. According to various embodiments of the present disclosure, the primary electronic device may determine whether a user checks the notification. According to various embodiments of the present disclosure, the primary electronic device may determine whether the user transitions the primary electronic device from an inactive state to an active state (e.g., from which the primary electronic device may infer that the user has checked the notification). According to various embodiments of the present disclosure, the primary electronic device may determine whether the notification was checked (e.g., viewed, received, or otherwise consumed) on another companion electronic device. For example, a companion electronic device on which the notification is checked may communicate an indication that the user checked the notification. The indication may be communicated using a push communication scheme.

If the primary electronic device determines that the user checked the primary electronic device (e.g., if the user checked the notification) at operation 230, then the primary electronic device may communicate an interrupt. The primary electronic device may communicate the interrupt to the companion electronic device to desynchronize delivery of the notification. As another example, if the primary electronic device receives an indication from another companion electronic device that the user checked (e.g., received or otherwise consumed) the notification, then the primary electronic device may communicate with a selected companion electronic device to desynchronize the delivery of the notification. A companion electronic device with which the primary electronic device desynchronizes notifications may be selected based on user preferences, contextual information, and/or the like.

At operation 235, the companion electronic device may receive the notification from the primary electronic device.

According to various embodiments of the present disclosure, operation 230 and operation 235 may be performed simultaneously, contemporaneously, or the like.

At operation 240, the companion electronic device desynchronizes display (e.g., delivery) of the notification. For example, upon receiving the interrupt to desynchronize notifications from the primary electronic device, the companion electronic device desynchronizes the display of the notification.

Figure 3:
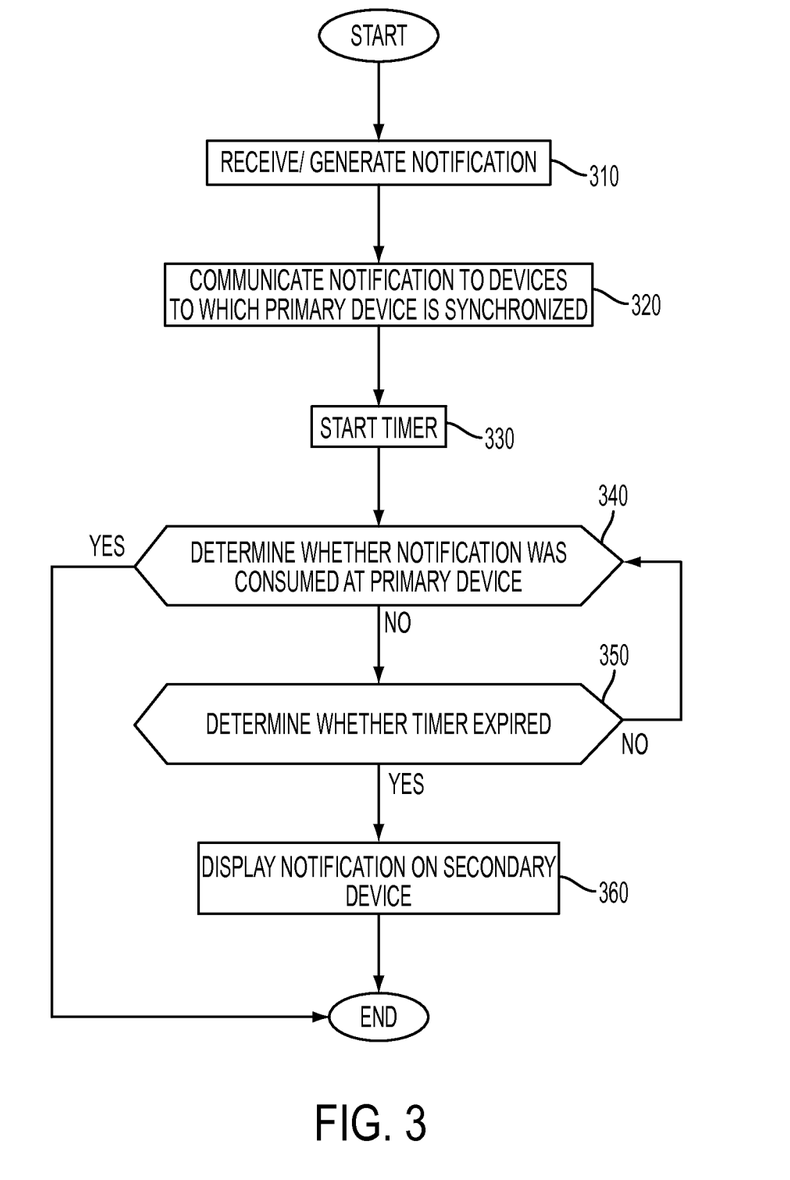
FIG. 3 illustrates a flowchart illustrating a method for providing notifications according to various embodiments of the present disclosure.

FIG. 3 is a flowchart illustrating a method for providing notifications according to various embodiments of the present disclosure.

Referring to FIG. 3, at operation 310, the primary electronic device receives and/or generates a notification. For example, the notification is delivered to the primary electronic device from another electronic device, a server, a network, and/or the like.

At operation 320, the primary electronic device communicates the notification to at least one companion electronic device to which the primary electronic device is synchronized. The primary electronic device may communicate the notification to the at least one companion electronic device using a push communication scheme.

At operation 330, the companion electronic device that received the notification starts a timer. For example, the companion electronic device may start a timer upon receiving the notification from the primary electronic device. The timer may be set for a preset time.

At operation 340, the companion electronic device determines whether the notification was checked (e.g., received or otherwise consumed) at the primary electronic device (or another companion electronic device). For example, the companion electronic device may determine whether the companion electronic device has received an interrupt and/or an indication from the primary electronic device or another companion electronic device as to whether the notification was checked by the user. If the user checks the notification on the primary electronic device or another companion electronic device, the primary electronic device may communicate an interrupt or an indication that the user checked the notification.

If the companion electronic device determines that the user checked the notification at operation 340, then the companion electronic device may end the process. For example, if companion electronic device determines that the user checked the notification, then the companion electronic device may end the process without displaying (e.g., delivering) the notification.

In contrast, if the companion electronic device determines that the notification was not checked at operation 340, then the companion electronic device may proceed to operation 350 at which the companion electronic device determines whether the timer expired.

If the companion electronic device determines that that the timer has not expired at operation 350, then the companion electronic device may return to operation 340.

In contrast, if the companion electronic device determines that the timer expired at operation 350, then the companion electronic device may proceed to operation 360 at which the companion electronic device displays (e.g., delivers) the notification.

Figure 4:
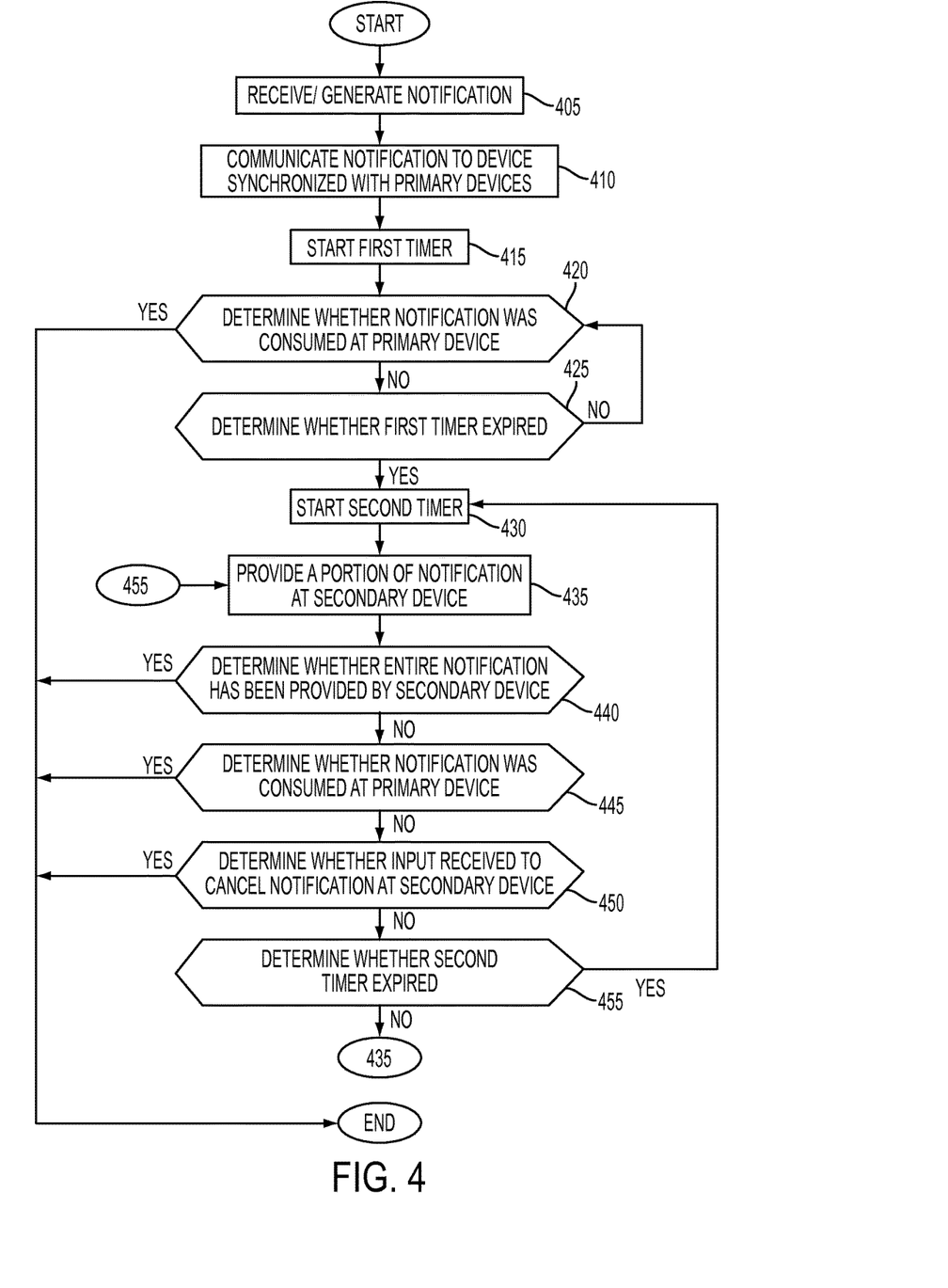
FIG. 4 illustrates a flowchart illustrating a method for providing notifications according to various embodiments of the present disclosure.

FIG. 4 is a flowchart illustrating a method for providing notifications according to various embodiments of the present disclosure;

Referring to FIG. 4, at operation 405, the primary electronic device receives and/or generates a notification. For example, the notification is delivered to the primary electronic device from another electronic device, a server, a network, and/or the like.

At operation 410, the primary electronic device communicates the notification to at least one companion electronic device to which the primary electronic device is synchronized. The primary electronic device may communicate the notification to the at least one companion electronic device using a push communication scheme.

At operation 415, the companion electronic device that received the notification starts a first timer. For example, the companion electronic device may start the first timer upon receiving the notification from the primary electronic device. The first timer may be set for a first preset time.

At operation 420, the companion electronic device determines whether the notification was checked (e.g., received or otherwise consumed) at the primary electronic device (or another companion electronic device). For example, the companion electronic device may determine whether the companion electronic device has received an interrupt and/or an indication from the primary electronic device or another companion electronic device as to whether the notification was checked by the user. If the user checks the notification on the primary electronic device or another companion electronic device, the primary electronic device may communicate an interrupt or an indication that the user checked the notification.

If the companion electronic device determines that the user checked the notification at operation 420, then the companion electronic device may end the process. For example, if companion electronic device determines that the user checked the notification, then the companion electronic device may end the process without displaying (e.g., delivering) the notification.

In contrast, if the companion electronic device determines that the notification was not checked at operation 420, then the companion electronic device may proceed to operation 425 at which the companion electronic device determines whether the first timer expired.

If the companion electronic device determines that that the first timer has not expired at operation 425, then the companion electronic device may return to operation 420.

If the companion electronic device determines that the first timer has expired at operation 425, then the companion electronic device may proceed to operation 430 at which the companion electronic device starts a second timer. The second timer may be set for a second preset time.

At operation 435, the companion electronic device may display a portion of the notification. For example, the companion electronic device may provide (e.g., deliver) a subset of the notification. The companion electronic device may provide a subset of information relating to the notification.

At operation 440, the companion electronic device determines whether an entire notification has been provided by the companion electronic device. For example, the companion electronic device determines whether in aggregate the entire notification has been provided by the companion electronic device. The companion electronic device may determine whether the subset of the notification provided in operation 435, in addition to any subsets of the notification that were previously provided, constitute the entire notification.

If the companion electronic device determines that the entire notification has been provided by the companion electronic device at operation 440, then the companion electronic device may end the process.

In contrast, if the companion electronic device determines that the entire notification has not been provided by the companion electronic device at operation 440, then the companion electronic device may proceed to operation 445 at which the companion electronic device determines whether the notification was checked at the primary electronic device (or another companion electronic device). For example, the companion electronic device may determine whether the companion electronic device has received an interrupt and/or an indication from the primary electronic device or another companion electronic device as to whether the notification was checked by the user. If the user checks the notification on the primary electronic device or another companion electronic device, the primary electronic device may communicate an interrupt or an indication that the user checked the notification.

If the companion electronic device determines that the user checked the notification at operation 445, then the companion electronic device may end the process. For example, if companion electronic device determines that the user checked the notification, then the companion electronic device may end the process without displaying (e.g., delivering) the notification.

In contrast, if the companion electronic device determines that the notification was not checked at operation 445, then the companion electronic device may proceed to operation 450 at which the companion electronic device determine whether an input has been received to cancel the notification at the companion electronic device. For example, the companion electronic device may determine whether the companion electronic device has received an interrupt and/or an indication from the primary electronic device or another companion electronic device as to whether the notification was cancelled by the user. As another example, the companion electronic device may determine whether the input for canceling the notification was entered to the companion electronic device.

If the companion electronic device determines that an input for cancelling the notification at the companion electronic device has been received at operation 450, then the companion electronic device may end the process.

In contrast, if the companion electronic device determines that an input for cancelling the notification at the companion electronic device has not been received at operation 450, then the companion electronic device may proceed to operation 455 at which the companion electronic may determine whether the second timer has expired.

If the companion electronic device determines that the second time has expired at operation 455, then the companion electronic device may return to operation 430.

In contrast, if the companion electronic device determines that the second timer has not expired at operation 455, then the companion electronic device may return to operation 435.

Figure 5:
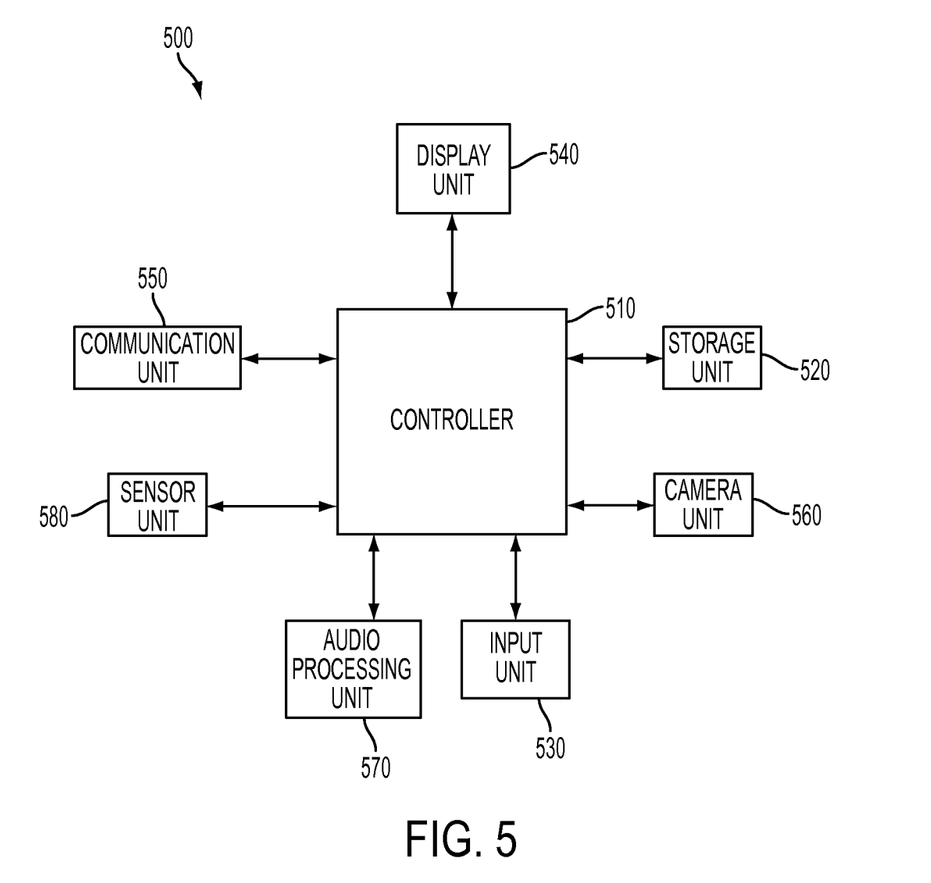
FIG. 5 illustrates a block diagram of a primary electronic device according to various embodiments of the present disclosure.

FIG. 5 is a block diagram of a primary electronic device according to various embodiments of the present disclosure.

Referring to FIG. 5, the primary electronic device 500 may include at least one controller 510, a storage unit 520, an input unit 530, a display unit 540, and a communication unit 550. The device 500 may also include a camera unit 560, an audio processing unit 570, a sensor unit 580, and/or the like.

According to various embodiments of the present disclosure, the primary electronic device 500 comprises at least one controller 510. The at least one controller 510 may be configured to operatively control the primary electronic device 500. For example, the at least one controller 510 may control operation of the various components or units included in the primary electronic device 500. The at least one controller 510 may transmit a signal to the various components included in the primary electronic device 500 and control a signal flow between internal blocks of the primary electronic device 500. In particular, according to various embodiments of the present disclosure, the at least one controller 510 may perform an action (e.g., a command, function, or the like) according to an input. For example, the at least one controller 510 may operatively communicate a notification with a companion electronic device. As another example, the at least one controller 510 may operatively desynchronize the providing (e.g., displaying and/or the like) of the notification at the companion electronic device. The at least one controller 510 may operatively communicate to the companion electronic device an interrupt and/or an indication that the notification was checked at the primary electronic device 500 and/or another companion electronic device. The at least one controller 510 may determine whether the primary electronic device 500 is being used (e.g., whether the primary electronic device 500 is in an active state, whether a user is viewing or using the primary electronic device 500, and/or the like). The at least one controller 510 may provide (e.g., display and/or the like) the notification to a user. The at least one controller 510 may analyze information received from a sensor unit 580.

The storage unit 520 can store user data, and the like, as well a program which performs operating functions according to various embodiments of the present disclosure. The storage unit 520 may include a non-transitory computer-readable storage medium. As an example, the storage unit 520 may store a program for controlling general operation of a primary electronic device 500, an Operating System (OS) which boots the primary electronic device 500, and application program for performing other optional functions such as a camera function, a sound replay function, an image or video replay function, a signal strength measurement function, a route generation function, image processing, and the like. Further, the storage unit 520 may store user data generated according to a user of the primary electronic device 500, such as, for example, a text message, a game file, a music file, a movie file, and the like. In particular, according to various embodiments of the present disclosure, the storage unit 520 may store an application or a plurality of applications that individually or in combination operatively communicate a notification with a companion electronic device, operatively desynchronize the providing (e.g., displaying and/or the like) of the notification at the companion electronic device, operatively communicate to the companion electronic device an interrupt and/or an indication that the notification was checked at the primary electronic device 500 and/or another companion electronic device, determine whether the primary electronic device 500 is being used (e.g., whether the primary electronic device 500 is in an active state, whether a user is viewing or using the primary electronic device 500, and/or the like), operatively provide the notification to the user, and/or the like.

The display unit 540 displays information inputted by user or information to be provided to user as well as various menus of the primary electronic device 500. For example, the display unit 540 may provide various screens according to a user of the primary electronic device 500, such as an idle screen, a message writing screen, a calling screen, and the like. In particular, according to various embodiments of the present disclosure, the display unit 540 may display an image and/or UI from which the user may interact with (e.g., select) a command and/or an item. According to various embodiments of the present disclosure, the display unit 540 may be configured as a touch screen, and the user may enter to the touchscreen an input for requesting to cancel a notification at the primary electronic device 500, an input for requesting to cancel the providing of the notification at a companion electronic device, an input for configuring notification settings, and/or the like. According to various embodiments of the present disclosure, the display unit 540 may display an interface which the user may manipulate or otherwise enter inputs via a touchscreen to enter selection of various functions of the primary electronic device 500. The display unit 540 can be formed as a Liquid Crystal Display (LCD), an Organic Light Emitting Diode (OLED), an Active Matrix Organic Light Emitting Diode (AMOLED), and/or the like. However, various embodiments of the present disclosure are not limited to these examples. Further, the display unit 540 can perform the function of the input unit 530.

The input unit 530 may include input keys and function keys for receiving user input. For example, the input unit 530 may include input keys and function keys for receiving an input of numbers or various sets of letter information, setting various functions, and controlling functions of the primary electronic device 500. For example, the input unit 530 may include a calling key for requesting a voice call, a video call request key for requesting a video call, a termination key for requesting termination of a voice call or a video call, a volume key for adjusting output volume of an audio signal, a direction key, and the like. In particular, the input unit 540 according to various embodiments of the present disclosure may transmit to the at least one controller 510 signals related to cancelling a notification at the primary electronic device 500, signals related to cancelling the providing of the notification at a companion electronic device, signals related to configuring notification settings, and/or the like. Such an input unit 530 may be formed by one or a combination of input means such as a touch pad, a touchscreen, a button-type key pad, a joystick, a wheel key, and/or the like.

The communication unit 550 may be configured for communicating with other devices and/or networks. According to various embodiments of the present disclosure, the communication unit 550 may be configured to communicate using various communication protocols and various communication transceivers. For example, the communication unit 550 may be configured to communicate via Bluetooth technology, NFC technology, WiFi technology, 2G technology, 3G technology, LTE technology, or another wireless technology, and/or the like.

The camera unit 560 may be configured to perform image capture. For example, the camera unit 560 may capture an image and/or a video. The camera unit may be configured to capture an image of an environment surrounding the primary electronic device 500. For example, the camera unit 560 may capture an image from which the at least one controller 510 may determine whether a user is viewing the screen of the primary electronic device 500.

The audio processing unit 570 may be formed as an acoustic component. The audio processing unit 570 transmits and receives audio signals, and encodes and decodes the audio signals. For example, the audio processing unit 570 may include a CODEC and an audio amplifier. The audio processing unit 570 is connected to a Microphone (MIC) and a Speaker (SPK). The audio processing unit 570 converts analog voice signals inputted from the Microphone (MIC) into digital voice signals, generates corresponding data for the digital voice signals, and transmits the data to the at least one control unit 510. Further, the audio processing unit 570 converts digital voice signals inputted from the at least one control unit 510 into analog voice signals, and outputs the analog voice signals through the Speaker (SPK). Further, the audio processing unit 570 may output various audio signals generated in the primary electronic device 500 through the Speaker (SPK). For example, the audio processing unit 570 can output audio signals according to an audio file (e.g. MP3 file) replay, a moving picture file replay, and the like through the speaker. In particular, according to various embodiments of the present disclosure, the audio processing unit 570 may provide a user with a notification, an alert, and/or the like.

The sensor unit 580 may include at least one sensor for detecting contextual information relating to the primary electronic device 500, and/or the like. For example, the sensor unit 580 may include a sensor for detecting a motion of the primary electronic device 500. The sensor unit 580 may include a sensor for detecting whether a user is using (e.g., viewing the screen, and/or the like) the primary electronic device 500. The sensor unit 580 may include a sensor for detecting a location of the primary electronic device 500.

Figure 6:
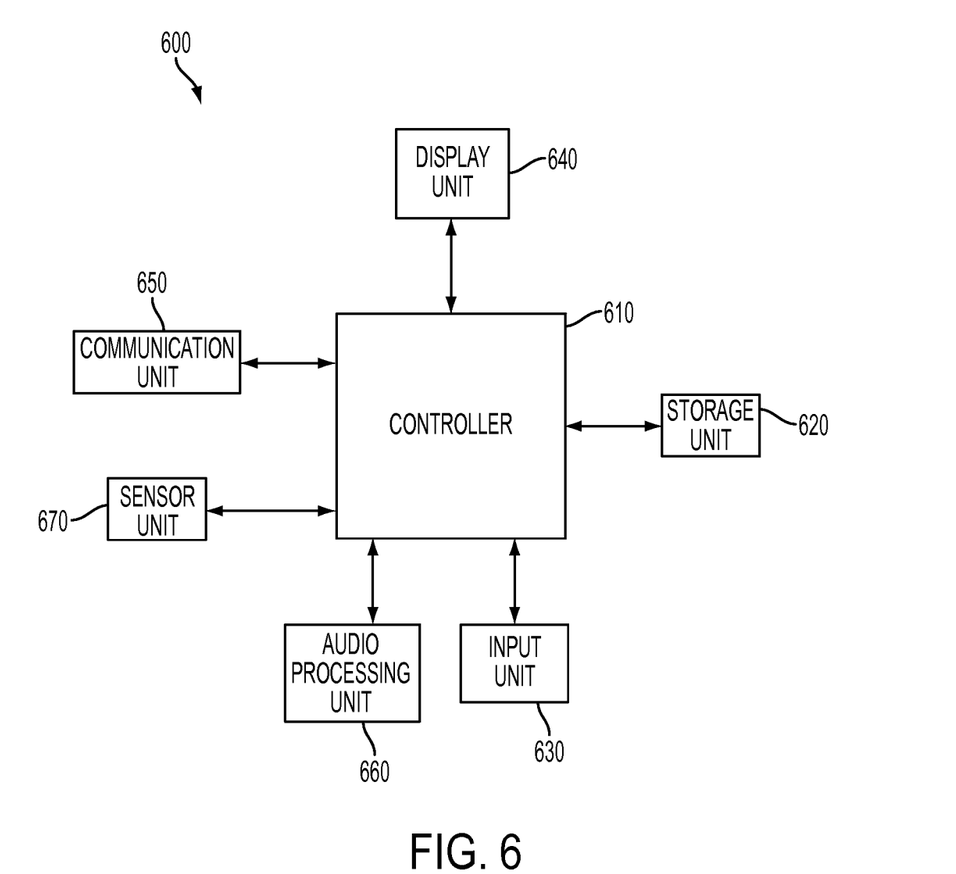
FIG. 6 illustrates a block diagram of a companion electronic device according to various embodiments of the present disclosure.

FIG. 6 is a block diagram of a companion electronic device according to various embodiments of the present disclosure.

Referring to FIG. 6, the companion electronic device 600 may include at least one controller 610, a storage unit 620, an input unit 630, a display unit 640, and a communication unit 650. The device 500 may also include an audio processing unit 660, a sensor unit 670, and/or the like.

According to various embodiments of the present disclosure, the companion electronic device 600 comprises at least one controller 610. The at least one controller 610 may be configured to operatively control the companion electronic device 600. For example, the at least one controller 610 may control operation of the various components or units included in the companion electronic device 600. The at least one controller 610 may transmit a signal to the various components included in the companion electronic device 600 and control a signal flow between internal blocks of the companion electronic device 600. In particular, according to various embodiments of the present disclosure, the at least one controller 610 may perform an action (e.g., a command, function, or the like) according to an input. For example, the at least one controller 610 may operatively communicate (e.g., receive) a notification with a primary electronic device. As another example, the at least one controller 610 may operatively desynchronize the providing (e.g., displaying and/or the like) of the notification received from the primary electronic device. The at least one controller 610 may operatively communicate (e.g., receive) an interrupt and/or an indication that the notification was checked at the primary electronic device and/or another companion electronic device. The at least one controller 610 may provide (e.g., display and/or the like) the notification to a user.

The storage unit 620 can store user data, and the like, as well a program which performs operating functions according to various embodiments of the present disclosure. The storage unit 620 may include a non-transitory computer-readable storage medium. As an example, the storage unit 620 may store a program for controlling general operation of a companion electronic device 600, an Operating System (OS) which boots the companion electronic device 600, and application program for performing other optional functions such as a camera function, a sound replay function, an image or video replay function, a signal strength measurement function, a route generation function, image processing, and the like. Further, the storage unit 620 may store user data generated according to a user of the companion electronic device 600, such as, for example, a text message, a game file, a music file, a movie file, and the like. In particular, according to various embodiments of the present disclosure, the storage unit 620 may store an application or a plurality of applications that individually or in combination operatively communicate a notification with a primary electronic device (e.g., to receive a notification from the primary electronic device), operatively desynchronize the providing (e.g., displaying and/or the like) of the notification, operatively communicate (e.g., receive) with the primary electronic device an interrupt and/or an indication that the notification was checked at the primary electronic device and/or another companion electronic device, operatively provide the notification to the user, and/or the like.

The display unit 640 displays information inputted by user or information to be provided to user as well as various menus of the companion electronic device 600. For example, the display unit 640 may provide various screens according to a user of the companion electronic device 600, such as an idle screen, a message writing screen, a calling screen, and the like. In particular, according to various embodiments of the present disclosure, the display unit 640 may display an image and/or UI from which the user may interact with (e.g., select) a command and/or an item. According to various embodiments of the present disclosure, the display unit 640 may be configured as a touch screen, and the user may enter to the touchscreen an input for requesting to cancel a notification, an input for configuring notification settings, and/or the like. According to various embodiments of the present disclosure, the display unit 640 may display an interface which the user may manipulate or otherwise enter inputs via a touchscreen to enter selection of various functions of the companion electronic device 600. The display unit 640 can be formed as a Liquid Crystal Display (LCD), an Organic Light Emitting Diode (OLED), an Active Matrix Organic Light Emitting Diode (AMOLED), and/or the like. However, various embodiments of the present disclosure are not limited to these examples. Further, the display unit 640 can perform the function of the input unit 630.

The input unit 630 may include input keys and function keys for receiving user input. For example, the input unit 630 may include input keys and function keys for receiving an input of numbers or various sets of letter information, setting various functions, and controlling functions of the companion electronic device 600. For example, the input unit 630 may include a calling key for requesting a voice call, a video call request key for requesting a video call, a termination key for requesting termination of a voice call or a video call, a volume key for adjusting output volume of an audio signal, a direction key, and the like. In particular, the input unit 630 according to various embodiments of the present disclosure may transmit to the at least one controller 610 signals related to cancelling a notification at the companion electronic device 600, signals related to cancelling the providing of the notification at a primary electronic device, signals related to configuring notification settings, and/or the like. Such an input unit 630 may be formed by one or a combination of input means such as a touch pad, a touchscreen, a button-type key pad, a joystick, a wheel key, and/or the like.

The communication unit 650 may be configured for communicating with other devices and/or networks. According to various embodiments of the present disclosure, the communication unit 650 may be configured to communicate using various communication protocols and various communication transceivers. For example, the communication unit 650 may be configured to communicate via Bluetooth technology, NFC technology, WiFi technology, 2G technology, 3G technology, LTE technology, or another wireless technology, and/or the like.

The audio processing unit 660 may be formed as an acoustic component. The audio processing unit 660 transmits and receives audio signals, and encodes and decodes the audio signals. For example, the audio processing unit 660 may include a CODEC and an audio amplifier. The audio processing unit 660 is connected to a Microphone (MIC) and a Speaker (SPK). The audio processing unit 660 converts analog voice signals inputted from the Microphone (MIC) into digital voice signals, generates corresponding data for the digital voice signals, and transmits the data to the at least one control unit 610. Further, the audio processing unit 660 converts digital voice signals inputted from the at least one control unit 610 into analog voice signals, and outputs the analog voice signals through the Speaker (SPK). Further, the audio processing unit 660 may output various audio signals generated in the companion electronic device 600 through the Speaker (SPK). For example, the audio processing unit 660 can output audio signals according to an audio file (e.g. MP3 file) replay, a moving picture file replay, and the like through the speaker. In particular, according to various embodiments of the present disclosure, the audio processing unit 660 may provide a user with a notification, an alert, and/or the like.

The sensor unit 670 may include at least one sensor for detecting contextual information relating to the companion electronic device 600, and/or the like. For example, the sensor unit 670 may include a sensor for detecting a motion of the companion electronic device 600. The sensor unit 670 may include a sensor for detecting whether a user is using (e.g., viewing the screen, and/or the like) the companion electronic device 600. The sensor unit 670 may include a sensor for detecting a location of the companion electronic device 600.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for desynchronizing notifications across multiple electronic devices, the method comprising:
   receiving, by a primary electronic device, a notification;
   displaying the notification;
   transmitting, by the primary electronic device, the notification to a companion electronic device to display the notification; and
   if a user has viewed the notification, transmitting, by the primary electronic device, a command to the companion electronic device to stop the displaying of the notification.

2. The method of claim 1, further comprising:
   determining whether the notification has been viewed by the user.

3. The method of claim 2, further comprising:
   if the primary electronic device determines that the notification has been viewed, transmitting the command to another companion electronic device.

4. The method of claim 2, wherein if the other companion electronic device receives the command, the other companion electronic device removes the notification.

5. The method of claim 2, further comprising:
   determining whether the primary electronic device is being moved.

6. The method of claim 2, further comprising:
   determining whether the notification has been dismissed on the primary electronic device.

7. The method of claim 2, further comprising:
   determining whether the user is using the primary electronic device.

8. The method of claim 2, further comprising:
   determining whether the primary electronic device is in an active state.

9. The method of claim 2, further comprising:
determining whether the user is viewing a screen of the primary electronic device.

10. The method of claim 1, further comprising:
determining, by the primary electronic device, whether the primary electronic device is in use contemporaneously with reception of the notification,
wherein, if the primary electronic device is determined to be in use contemporaneously with reception of the notification, omitting the transmitting of the notification to the companion electronic device.

11. The method of claim 1, further comprising:
delaying, by the companion electronic device, the displaying of the notification from a time at which the companion electronic device receives the notification.

12. The method of claim 1, further comprising:
incrementally providing, by the companion electronic device, a subset of the notification.

13. The method of claim 12, further comprising:
iteratively starting a timer and providing a subset of the notification upon expiration of the timer.

14. The method of claim 13, further comprising:
receiving an input for interrupting the iterative starting of the timer and providing of the subset of the notification; and
in response to receiving the input for interrupting the iterative starting of the timer and providing of the subset of the notification, interrupting the timer and providing a next subset of the notification.

15. The method of claim 14, wherein further comprising:
in response to interrupting the timer and providing the next subset of the notification, continuing to iteratively start the timer and providing the subset of the notification upon expiration of the timer.

16. The method of claim 13, further comprising:
receiving an input for interrupting the iterative starting of the timer and providing of the subset of the notification; and
in response to receiving the input for interrupting the iterative starting of the timer and providing of the subset of the notification, interrupting the timer and providing a remainder of the notification.

17. The method of claim 1, further comprising:
incrementally providing a subset of the notification until an earlier of the entire notification being provided and the notification being cancelled.

18. The method of claim 17, wherein the notification being cancelled corresponds to the companion electronic device receiving an interrupt from one or more of a primary electronic device and another companion electronic device.

19. The method of claim 17, wherein the notification being cancelled corresponds to the companion electronic device receiving a user input requesting cancellation of the notification.

20. A non-transitory computer-readable storage medium storing instructions that, when executed, cause at least one processor to perform the method of claim 1.

21. A primary electronic device for desynchronizing notifications across multiple electronic devices, the apparatus comprising:
a transceiver; and
a processor configured to:
receive a notification using the transceiver,
display the notification,
transmit the notification to a companion electronic device to display the notification, and
if a user has viewed the notification, transmit a command to the companion electronic device to stop the display of the notification.

22. The device of claim 21, wherein the processor is further configured to determine whether the notification has been viewed by the user.

23. The device of claim 22, wherein the processor is further configured to:
if the notification has been viewed, transmit the command to another companion electronic device.

24. The device of claim 22, wherein the processor is further configured to determine whether the primary electronic device is being moved.

25. The device of claim 22, wherein the processor is further configured to determine whether the notification has been dismissed.

26. The device of claim 22, wherein the processor is further configured to determine whether the user is using the primary electronic device.

27. The device of claim 22, wherein the processor is further configured to determine whether the primary electronic device is in an active state.

28. The device of claim 22, further comprising:
a sensor configured to detect contextual information relating to a context of the primary electronic device,
wherein the processor is further configured to determine whether the user is viewing a screen of the primary electronic device.

29. The device of claim 21, wherein the processor is further configured to:
determine whether the primary electronic device is in use contemporaneously with reception of the notification, and
if the processor determines that the primary electronic device is in use contemporaneously with reception of the notification, omit transmission of the notification to the companion electronic device.

30. A companion electronic device for desynchronizing notifications across multiple electronic devices, the apparatus comprising:
a transceiver;
a display; and
a processor configured to:
receive a notification from a primary electronic device using the transceiver,
display the notification, and
in response to receiving a command indicating the user has viewed the notification, stopping the display of the notification.

31. The device of claim 30, wherein, when the user views the notification on the primary device, the primary device is configured to transmit the command to the companion electronic device.

32. The device of claim 31, when the user views the notification on another companion device, the primary device is configured to transmit the command to the companion electronic device.

33. The device of claim 30, wherein the processor is further configured to delay the display of the notification from a time at which the companion electronic device receives the notification.

34. The device of claim 30, wherein the processor is further configured to incrementally provide a subset of the notification.

35. The device of claim 34, wherein the processor is further configured to provide each subset of the notification upon expiration of a respective preset time threshold.

36. The device of claim 35, wherein the processor is further configured to:
   receive an input for interrupting the respective preset time threshold, and
   in response to receiving the input for interrupting the respective preset time threshold, provide a next subset of the notification.

37. The device of claim 36, wherein the processor is further configured to, in response to interrupting the respective preset time threshold, continuing to incrementally provide a subset of the notification by providing each subset of the notification upon expiration of a respective preset time threshold.

38. The device of claim 35, wherein the processor is further configured to:
   receive an input for interrupting the respective preset time threshold, and
   interrupt the respective preset time threshold and provide a remainder of the notification.

39. The device of claim 35, wherein the processor is further configured to:
   receive an input for canceling the notification, and
   in response to receiving the input for canceling the notification, control the transceiver to discontinue receiving the notification.

40. The device of claim 30, wherein the processor is further configured to incrementally provide a subset of the notification until the entire notification is provided.

* * * * *